United States Patent
Le et al.

(10) Patent No.: US 12,414,213 B2
(45) Date of Patent: Sep. 9, 2025

(54) LOW-VOLTAGE DIMMING CONTROLLER AND A LIGHTING CONTROL SYSTEM

(71) Applicants: Self Electronics Co., Ltd., Zhejiang (CN); Self Electronics USA Corporation, Norcross, GA (US); Wanjiong Lin, Zhejiang (CN)

(72) Inventors: Zai Le, Zhejiang (CN); Chengke Zhang, Zhejiang (CN)

(73) Assignees: Self Electronics Co., Ltd., Ningbo (CN); Wanjiong Lin, Ningbo (CN); Self Electronics USA Corporation, Norcross, GA (US)

(*) Notice: Subject to any disclaimer, the term of this patent is extended or adjusted under 35 U.S.C. 154(b) by 325 days.

(21) Appl. No.: 18/168,190

(22) Filed: Feb. 13, 2023

(65) Prior Publication Data

US 2023/0262866 A1    Aug. 17, 2023

(30) Foreign Application Priority Data

Feb. 14, 2022 (CN) .................. 202210134668.X

(51) Int. Cl.
| | |
|---|---|
| *H05B 47/115* | (2020.01) |
| *H05B 45/10* | (2020.01) |
| *H05B 45/20* | (2020.01) |
| *H05B 47/18* | (2020.01) |
| *H05B 47/19* | (2020.01) |

(52) U.S. Cl.
CPC ........... *H05B 47/115* (2020.01); *H05B 47/18* (2020.01)

(58) Field of Classification Search
CPC ........ H05B 47/19; H05B 47/11; H05B 45/20; H05B 45/10; H05B 47/13; H05B 47/14; H05B 47/18
See application file for complete search history.

(56) References Cited

U.S. PATENT DOCUMENTS

| | | | | |
|---|---|---|---|---|
| 2011/0248648 A1* | 10/2011 | Liu | ......................... | H05B 45/14 315/246 |
| 2012/0235579 A1* | 9/2012 | Chemel | ................... | F21V 15/01 315/152 |
| 2012/0280637 A1* | 11/2012 | Tikkanen | ............. | H05B 45/385 315/294 |
| 2018/0012137 A1* | 1/2018 | Wright | ............... | G05B 13/0265 |
| 2019/0290795 A1* | 9/2019 | Brockschmidt | ........... | A61L 2/24 |
| 2020/0052997 A1* | 2/2020 | Ramanathan | ........... | H04L 45/20 |

* cited by examiner

*Primary Examiner* — Wei (Victor) Y Chan
(74) *Attorney, Agent, or Firm* — Wang Law Firm, Inc.

(57) ABSTRACT

A low-voltage dimming controller and a lighting control system, the low-voltage dimming controller includes a power supply circuit, a dimming circuit, a protection circuit and a signal control unit connection port, and the signal control unit connection port is removable to set the signal control unit; the invention can freely set the signal control unit according to different lighting needs, simplifies the terminal installation, reduces maintenance costs, and can be widely used in shelf and cabinet lighting control.

7 Claims, 5 Drawing Sheets

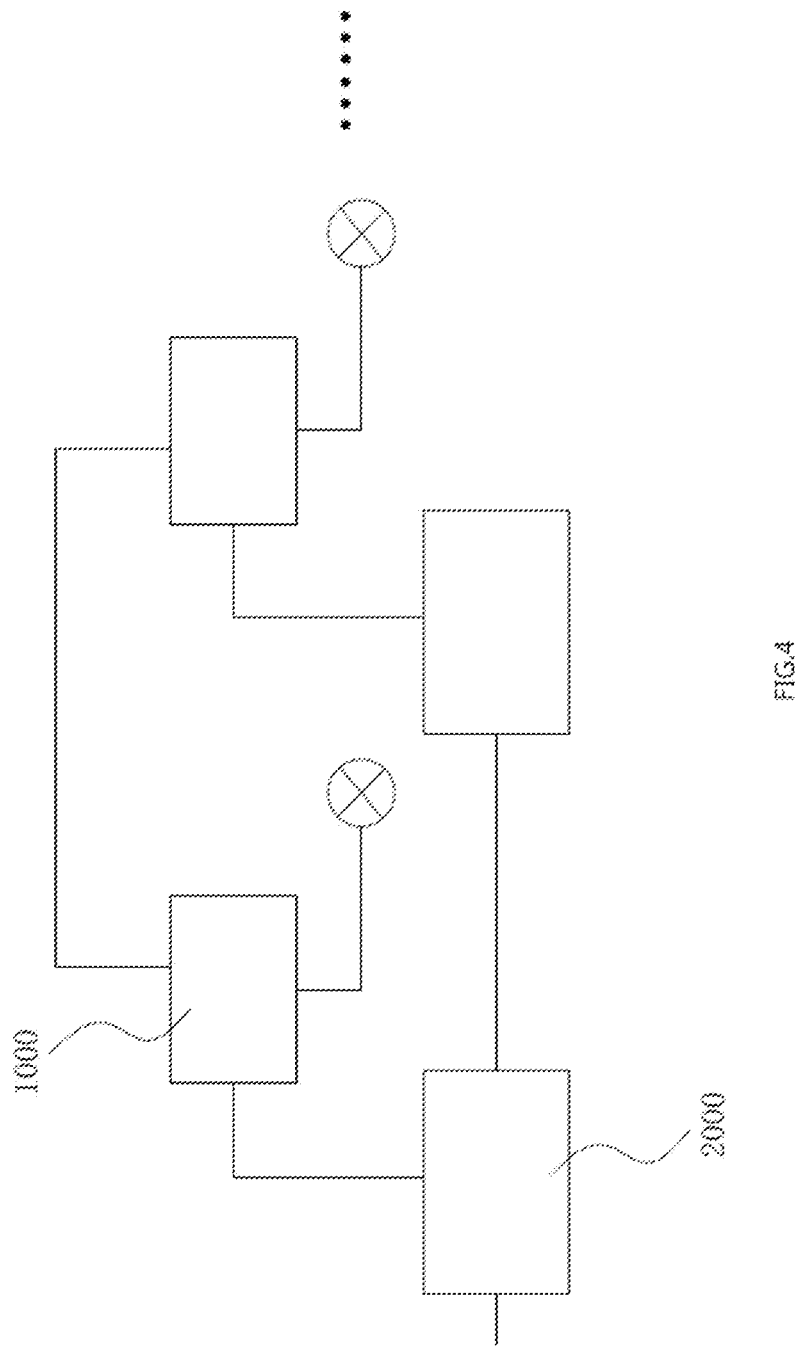

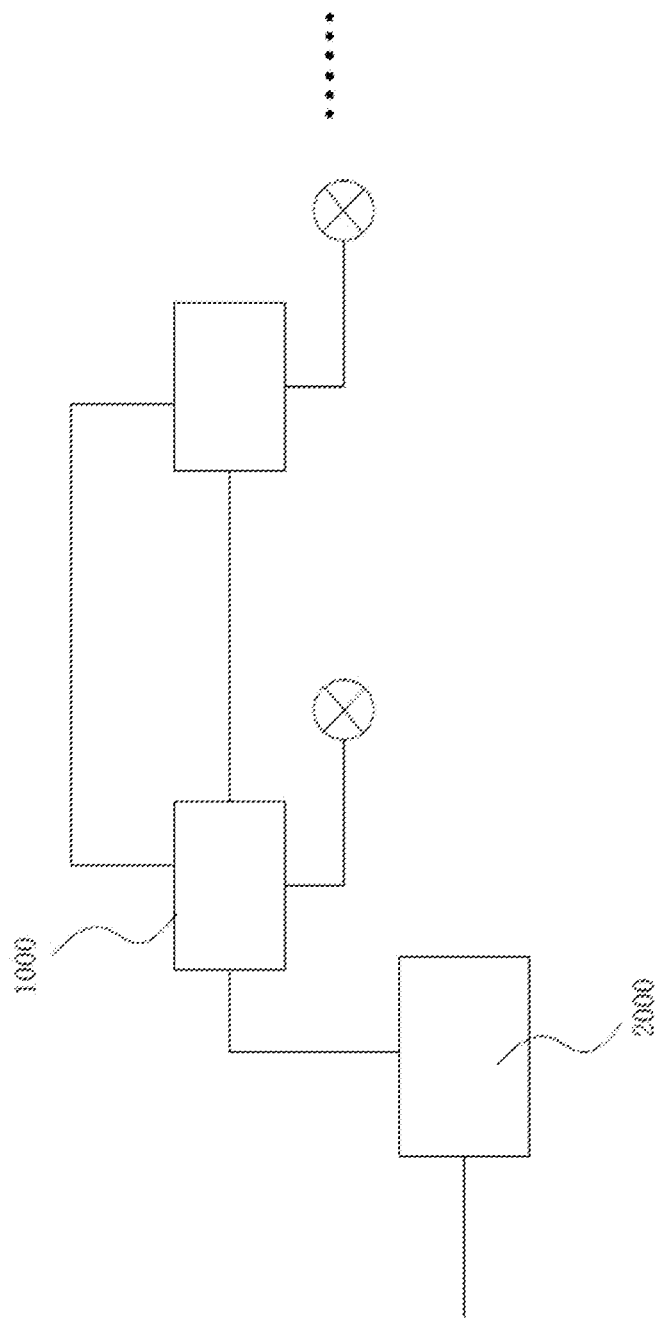

LOW-VOLTAGE DIMMING CONTROLLER AND A LIGHTING CONTROL SYSTEM

RELATED APPLICATION

This application claims priority to a Chinese Patent Application No. CN202210134668.X, filed on Feb. 14, 2022.

FIELD OF THE TECHNOLOGY

The invention relates to the field of lighting control, in particular, a low-voltage dimming controller and a lighting control system.

BACKGROUND

With the continuous development of lighting technology, more and more occasions, especially in the field of commercial lighting, such as shopping malls, supermarkets, need to lay a large area of lighting equipment, which will give rise to the problem of laying lines, a large number of lighting equipment not only need power supply also need dimming control, so there are many lines, sometimes there are not enough power outlets, additional power outlets will increase the time and labor costs.

Therefore, it becomes important to make lighting systems more convenient and cost effective to power and control.

BRIEF SUMMARY THE TECHNOLOGY

In view of this, the present invention provides a low-voltage dimming controller to solve the above technical problems.

A low-voltage dimming controller, comprising a power supply circuit, a dimming circuit and a protection circuit, it also includes a signal control unit connection port, which is detachable with a signal control unit.

The signal control unit connection port is detachable with a signal control unit.

The low-voltage dimming controller, wherein it also comprises a signal adjustment circuit, adjusting the signal at the input end so that its voltage meets the requirements of the dimming circuit, the input end is connected to the signal output of the signal control unit connection port and is provided with a first interconnection interface, and the output end is connected to the dimming circuit and is provided with a second interconnection interface.

The low-voltage dimming controller, wherein the signal adjustment circuit is provided with a comparison circuit, the comparison circuit is provided with a reference signal smaller than the input signal, and the comparison circuit compares the input signal with the reference signal and outputs a high level whose amplitude is determined by the power supply circuit.

The low-voltage dimming controller, wherein the low-voltage dimming controller is provided with a plurality of tap ports connected in parallel for connection to the lamps.

The low-voltage dimming controller, wherein the low-voltage dimming controller is provided with a sensor connection port.

The low-voltage dimming controller, wherein the sensor connection port comprises an infrared sensor connection port and a human sensor connection port.

The low-voltage dimming controller, wherein the dimming circuit is a two-wire dimming and color mixing circuit.

The low-voltage dimming controller, wherein the low-voltage dimming controller is provided with a supply voltage interconnection interface.

A lighting control system comprising a drive power supply, it also comprises a plurality of low-voltage dimming controllers described above, the low-voltage dimming controllers are in sequential voltage interconnection and signal interconnection, the initial low-voltage dimming controller is connected to the drive power supply and the low voltage dimming controller is fitted with a signal control unit.

A lighting control system comprising a plurality of drive power supplies, it also comprises the same number of low-voltage dimming controllers as the drive power supplies, the drive power supplies are in sequential interconnection, the low-voltage dimming controllers sequential signal interconnection, the initial low-voltage dimming controller installed with a signal control unit, each drive power supply corresponding to a low-voltage dimming controller power supply connection.

Technical Effects of the Present Invention

The low-voltage dimming controller and the lighting control system of the present invention realize the signal synchronization problem between multiple LED lighting control systems through the interconnection of dimming control signals to achieve synchronization of lamp state changes, and at the same time, the plugging and unplugging method between different lighting units simplifies terminal installation and reduces maintenance costs, which can be widely used in shelf and cabinet lighting control.

BRIEF DESCRIPTION OF THE DRAWINGS

Embodiments of the present invention are described below in connection with the accompanying drawings, wherein.

FIG. 4 shows a wireframe structure of a lighting control system of this embodiment.

FIG. 5 shows a wireframe structure of another embodiment of a lighting control system.

DETAILED DESCRIPTION OF THE INVENTION

Figure 1:
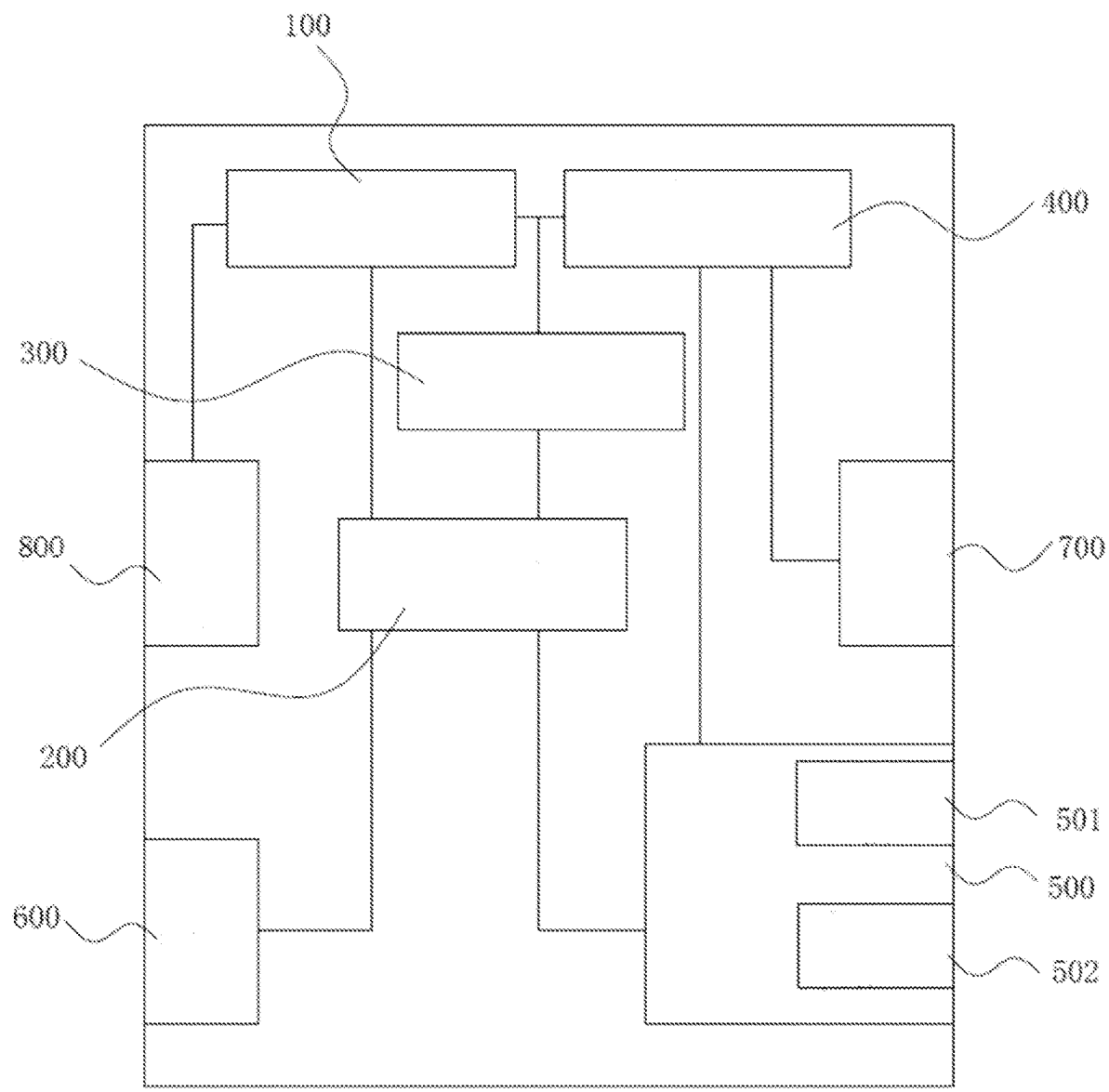
FIG. 1 shows a wireframe structure of a low-voltage dimming controller of this embodiment.

The following specific embodiments of the present invention are described in further detail based on the accompanying drawings. It should be understood that the description of embodiments of the present invention herein is not intended to limit the scope of protection of the present invention.

As shown in FIG. 1 to 5, the low-voltage dimming controller 1000 of this embodiment includes power supply circuit 100, dimming circuit 200, protection circuit 300, signal control unit connection port 400 and signal adjustment circuit 500. The signal control unit connection port 400 is detachable with the signal control unit, the signal adjustment circuit 500 adjusts the signal at the input end so that its voltage meets the requirements of the dimming circuit 200, the input end is connected to the signal output end of the signal control unit connection port 400 and is provided with a first interconnection interface 501, the output end is connected to the dimming circuit 200 and is provided with a second interconnection interface 502.

The signal control unit connection port 400 and the signal control unit can be detachably set means that a plug connection can be set, or a welding, or a screw connection, that is, a detachable electrical connection can be achieved.

The low-voltage dimming controller 1000 of this embodiment is provided with a signal control unit connection port 400, and the signal control unit is an intelligent control module that can realize the functions of calculation, storage, etc. In general, a single-chip computer is used. In this embodiment, low-voltage dimming controller 1000 and signal control unit are set separately, and signal adjusting circuit 500 is added, so that lamps can be laid in a large area. When multiple low-voltage dimming controllers 1000 are needed, only one low-voltage dimming controller 1000 is needed to connect to signal control unit 401. The rest can be transmitted through interconnection to get control signals, here the control signals are mainly dimming signals, including brightness and color temperature. The first interconnection interface 501 and the second interconnection interface 502 mentioned above are used to input and output control signals respectively after the low-voltage dimming controller 1000 is interconnected with other low-voltage dimming controllers 1000. Because the signal control unit is peripheral, it is not drawn in the figure.

The signal adjustment circuit 500 adjusts the signal at the input end so that its voltage meets the requirements of the dimming circuit 200. This is for that the signal received by the interconnected low-voltage dimming controller 1000 can drive the dimming circuit 200 in a stable manner during the interconnection process. The dimming circuit 200 using different devices may result in different signal voltages required, generally, the input signal voltage needs to be above 3V.

In this embodiment, the signal adjustment circuit 500 is provided with a comparison circuit 503, the comparison circuit 503 is provided with a reference signal smaller than the input signal, and the comparison circuit 503 compares the input signal with the reference signal and outputs a high level whose amplitude is determined by said power supply circuit 100.

In any of the low-voltage dimming controller 1000 after interconnection, the input signal is connected to the comparison circuit 503 to compare with the reference signal, when the input signal is greater than the reference signal, the comparison circuit 503 output high level, the amplitude of the high level is determined by the supply voltage, the comparison circuit 503 output signal is divided into two ways, one way is provided as the output signal for interconnection, passed to the next low-voltage dimming controller 1000, and connected to the input signal of the next low-voltage dimming controller 1000; one way passed through a resistor and connected to the dimming circuit 200 of the low-voltage dimming controller 1000. The comparison circuit 503 provides the isolation of the input and output signals, so that the signals of this low-voltage dimming controller 1000 are generated by itself, solving the problem of signal attenuation and driving capability during the signal transmission.

Figure 2:
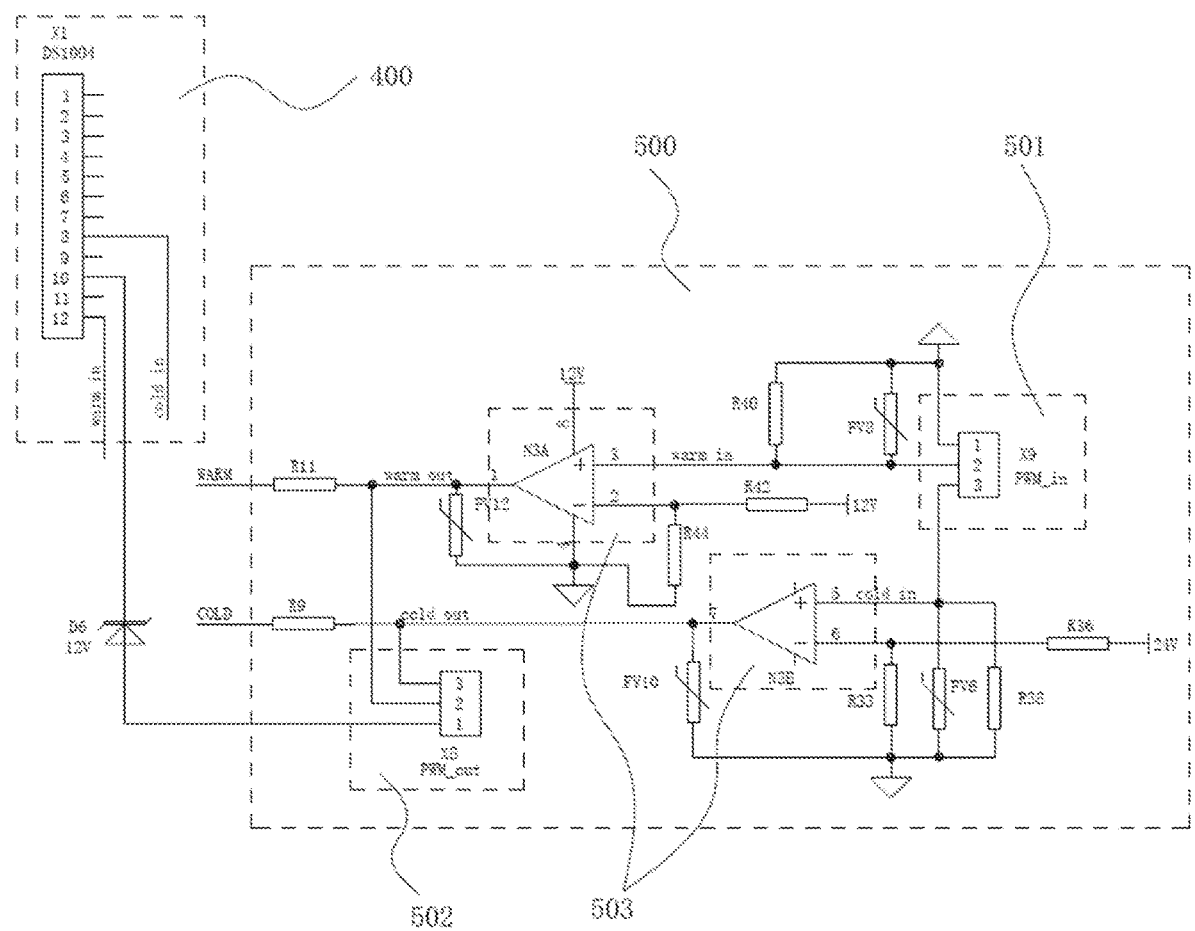
FIG. 2 shows a circuit diagram of a signal adjustment circuit of this embodiment.

The specific circuit diagram is shown in FIG. 2. X9 is the first interconnection interface 501 of the three-wire PWM signal input, including Warm in PWM control line, Cold in PWM control line and ground line. The warm in and cold in PWM signals are input to pin 3 and pin 5 of op-amp N3 (including N3A and N3B) in two separate ways, and the amplitude of the warm in and cold in PWM signals are determined by the design. When the pin 3 and pin 5 of N3 are at the low level of the input PWM signal, theoretically their voltage to ground is 0V, in actual operation, it cannot reach the absolute 0V voltage, at the same time, due to the high resistance input characteristics of the op-amp, when subjected to external interference signals, it is easy to line out high voltage at the pin, which leads to the op-amp false triggering, R38 and R40 are connected with the pin 3 and pin 5 to ground between, R38 and R40 are connected to the ground between pin 5 and 3, respectively, which changes the impedance of pin 5 and pin 3 to ground and enhances the anti-interference ability of the op-amp. Since X9 is an exposed interface, it is easy to be electrostatic interference, FV6 and FV8 can suppress the electrostatic interference from X9, thus preventing the op-amp from being damaged by static electricity. The R42 and R44 connected to the pin 2 of the op-amp are connected in series, which are two voltage dividing resistors used to set the reference voltage of the pin 2, the reference voltage can be set according to the design, and is not a unique fixed value. The reference voltage on pin 2 is compared with the voltage on pin 3 in real time, and when the voltage on pin 3 is higher than the voltage on pin 2, pin 1 outputs a high level, the amplitude of which is equal to the supply voltage of the op-amp (12V in this example). Pin 6 has the same peripheral circuit architecture as pin 2, and as mentioned before, the power supply used to set the reference voltage on pin 6 can also be 24V according to the design for convenience. Pin 1 and pin 7 are the output ports of PWM signal, are also bare ports, which are easy to be external electrostatic interference. FV10 and FV12 can prevent the op amp from being electrostatic damage. The PWM signal on pins 1 and 7 is connected to the driving pole of the switching tube of the dimming circuit 200, and the rising and falling edges of the PWM signal are rapidly changing, which can easily oscillate with the distribution parameters on the circuit and lead to abnormal switching of the switching tube. R9 and R11 are connected in series in the driver circuit to attenuate the oscillation signal and prevent the abnormal switching of the switching tube.

To enable the installation and control of more lamps, in this embodiment, the low-voltage dimming controller is provided with a plurality of tap ports 600 for connecting lamps in parallel.

To further expand the functionality, in this embodiment, the low-voltage dimming controller is provided with a sensor connection port 700. Further, in this embodiment, the sensor connection port 700 includes an infrared sensor connection port and a human sensor connection port.

Figure 3:
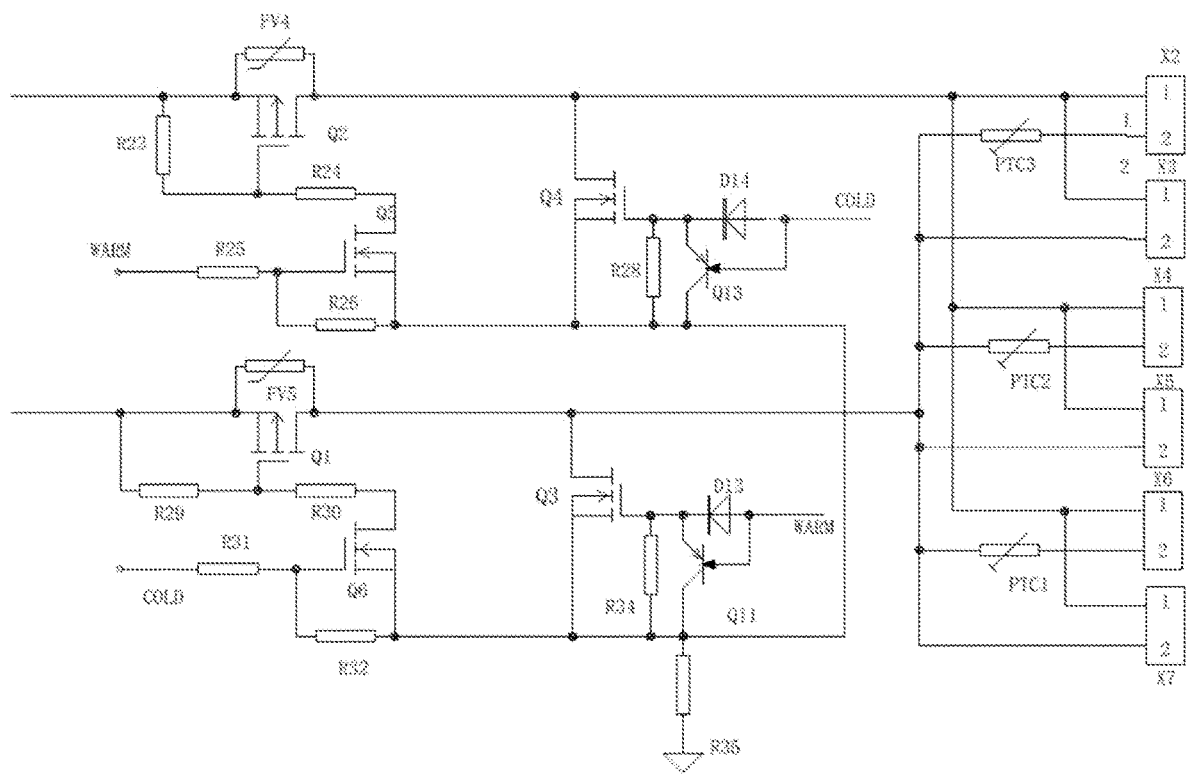
FIG. 3 shows a circuit diagram of a dimming circuit of this embodiment.

In this embodiment, the dimming circuit 200 is a two-wire dimming and color mixing circuit, as shown in FIG. 3. This embodiment of the low-voltage dimming controller 1000 applied in this type of dimming circuit is particularly effective.

In this embodiment, the low-voltage dimming controller is provided with a supply voltage interconnection interface 800. The above setup requires only one low-voltage dimming controller to be connected to the drive power supply when the power allows, while the rest can take power through the interconnection.

The lighting control system of this embodiment, including a drive power supply 2000, also includes a plurality of the low-voltage dimming controller 1000 mentioned above, the low-voltage dimming controller 1000 sequential voltage interconnection and signal interconnection, the initial low-voltage dimming controller 1000 is connected to the drive power supply 2000 and the low-voltage dimming controller 1000 installed with a signal control unit.

Another embodiment of the lighting control system, including a plurality of drive power supplies 2000, also includes the low-voltage dimming controller 1000 with the same number of drive power supplies 2000, and the drive power supplies 2000 sequential interconnection, the low-voltage dimming controller 1000 sequential signal interconnection, the initial low-voltage dimming controller 1000 is installed with signal control unit, each drive power supply 2000 corresponding to give a low-voltage dimming controller 1000 power supply connection.

The above are only preferred embodiments of the present invention, and are not used to limit the protection scope of the present invention. Any modification, equivalent replacement or improvement within the spirit of the present invention is covered by the scope of the claims of the present invention.

What is claimed is:

1. A lighting control system, comprising a plurality of low-voltage dimming controllers (1000), and the low-voltage dimming controllers (1000) sequential signal interconnection;
    the low-voltage dimming controller (1000) comprises a power supply circuit (100), a dimming circuit (200), a protection circuit (300), a signal control unit connection port (400) and a signal adjustment circuit (500);
    the signal control unit connection port (400) is configured to be detachable with a signal control unit, one low-voltage dimming controller is connected to the signal control unit, the signal control unit connection port (400) is connected to the input end of the signal adjustment circuit (500);
    the signal adjustment circuit (500) comprises a first interconnection interface (501), a comparison circuit (503) and a second interconnection interface (502) in sequential interconnection, the first interconnection interface (501) is provided at an input end of the signal adjustment circuit (500) and the input end is connected to the output end of the signal control unit connection port (400), the second interconnection interface (502) is provided at an output end of the signal adjustment circuit (500) and is connected to the dimming circuit (200);
    the first interconnection interface (501) and the second interconnection interface (502) are connected with other low-voltage dimming controllers (1000), the first interconnection interface (501) and the second interconnection interface (502) are adapted to input and output control signals respectively after the one low-voltage dimming controller is interconnected with the other low-voltage dimming controllers (1000);
    the comparison circuit (503) in any of the low-voltage dimming controller (1000) after interconnection, is provided with a reference signal smaller than an input signal, and the comparison circuit (503) is configured to compare the input signal with the reference signal and outputs a high level whose amplitude is determined by the power supply circuit (100); output signal of the comparison circuit (503) is divided into two ways, one way for interconnection, passed to the next low-voltage dimming controller (1000); one way passed through a resistor and connected to the dimming circuit (200) of the low-voltage dimming controller (1000).

2. The lighting control system as claimed in claim 1, wherein the low-voltage dimming controller is provided with a plurality of tap ports (600) connected in parallel for connection to the lamps.

3. The lighting control system as claimed in claim 1, wherein the low-voltage dimming controller is provided with a sensor connection port (700).

4. The lighting control system as claimed in claim 3, wherein the sensor connection port (700) comprises an infrared sensor connection port and a human sensor connection port.

5. The lighting control system as claimed in claim 1, wherein the dimming circuit (200) is a two-wire dimming and color mixing circuit.

6. The lighting control system as claimed in claim 1, wherein the low-voltage dimming controller is provided with a supply voltage interconnection interface (800).

7. The lighting control system as claimed in claim 1 comprising a plurality of drive power supplies (2000), the drive power supplies (2000) are in sequential interconnection, each drive power supply (2000) corresponding to a low-voltage dimming controller (1000) power supply connection.

* * * * *